United States Patent [19]

Robison

[11] Patent Number: 4,811,874

[45] Date of Patent: Mar. 14, 1989

[54] SPARE TIRE CARRIER

[76] Inventor: Vincent R. Robison, 47901 Pheasant Crest, Avondale, Colo. 81022

[21] Appl. No.: 116,635

[22] Filed: Nov. 3, 1987

[51] Int. Cl.⁴ ............................................. B62D 43/02
[52] U.S. Cl. ............................ 224/42.21; 224/42.06; 414/466
[58] Field of Search ................. 224/42.03 R, 42.03 A, 224/42.06, 42.12, 42.21, 42.26; 414/462, 463, 464, 465, 466; 296/37.2, 37.6; D12/202

[56] References Cited

U.S. PATENT DOCUMENTS 4,484,699  11/1984  Heck ................................. 224/42.21
4,561,575  12/1985  Jones ................................ 224/42.21

FOREIGN PATENT DOCUMENTS 336654  5/1920  Fed. Rep. of Germany ... 224/42.06
373850  6/1932  United Kingdom ............. 224/42.21

Primary Examiner—Henry J. Recla
Assistant Examiner—David Voorhees
Attorney, Agent, or Firm—Dean P. Edmundson

[57] ABSTRACT

A spare tire carrier is described for attachments to a vehicle (e.g., to the bumper). The carrier includes an elongated leg member which can be moved between an upward position and a lowered position. Bias means (e.g., a spring) biases the leg member toward its upward position. A tire support arm is secured to the leg member, and the spare tire can be detachably secured to the support arm. Lock means is used to secure the leg in either the upward or the lowered position, as needed.

17 Claims, 3 Drawing Sheets

SPARE TIRE CARRIER

FIELD OF THE INVENTION

This invention relates to tire carriers. More particularly, this invention relates to carriers for spare tires, e.g., on vehicles such as trucks, motor homes, trailers, etc.

BACKGROUND OF THE INVENTION

The carrying of a spare tire in a vehicle is a virtual necessity when traveling extensively or when traveling off of main roads where there isn't much traffic. This is especially true for recreational vehicles (such as motor homes, travel trailers) and pickup trucks.

Many vehicles are not provided with a tire carrier at all, and where a spare tire carrier is provided it usually is inconvenient or cumbersome to use. For example, some tire carriers are located under the vehicle and it is necessary to lay on your back under the vehicle to both take off the spare tire and then to put the tire back again when it isn't needed. Of course, it is necessary to lift the tire when taking it off the carrier and also when putting it back on the carrier.

Although there are spare tire carriers for mounting on a bumper, there are still problems associated with the use of such carriers. For example, it is still necessary to lift the tire from the ground up to the carrier before the tire can be attached. Also, the tire must be lifted off the carrier when taking it off.

The spare tire for trucks or motor homes can often weight as much as 60 to 70 pounds or more. As a result, it is difficult (if not impossible) for many people (e.g., elderly persons or women) to lift the tire to put it on the carrier or even to take it off when needed. Also, some people have had back problems and are not able to lift something as heavy as a spare tire.

There has not heretofore been provided a spare tire carrier having the advantages provided by the present invention.

SUMMARY OF THE PRESENT INVENTION

In accordance with the present invention there is provided a spare tire carrier which can be easily and readily installed on a recreational vehicle, pickup, trailer, etc. The tire carrier comprises:

(a) an upright tubular housing having upper and lower ends, wherein the lower end is open;

(b) mounting means for securing the tubular housing to the vehicle (e.g., to the bumper) in a manner such that the housing is vertical;

(c) an elongated leg member slidably received in the tubular housing and being movable within the housing between an upward position and a lowered position;

(d) a tire support arm secured to the elongated leg member;

(e) tire attachment means carried by the support arm for detachably securing the tire to the support arm;

(f) bias means for biasing the leg member toward its normal upward position;

(g) first lock means adapted to lock the leg member in its upward position; and (h) second lock means adapted to lock the leg member in its lowered position.

In order to attach a tire to the carrier the leg member is released and then pushed downwardly where it can be locked in its lowered position. This lowers the tire support arm also. Then the tire can be rolled to a position adjacent the tire support arm and attached to it. The leg member is then released so that the bias means (e.g., a spring) raises the leg member to its upward position where it can be locked for normal travel. In order to take the tire off the carrier reverse procedure is used.

The tire carrier of this invention is very convenient to use and eliminates the need to manually lift the tire in order to take it off the carrier or to put it on the carrier. Accordingly, elderly persons, women, and persons with back problems are able to operate the carrier system.

Other advantages of the tire carrier will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
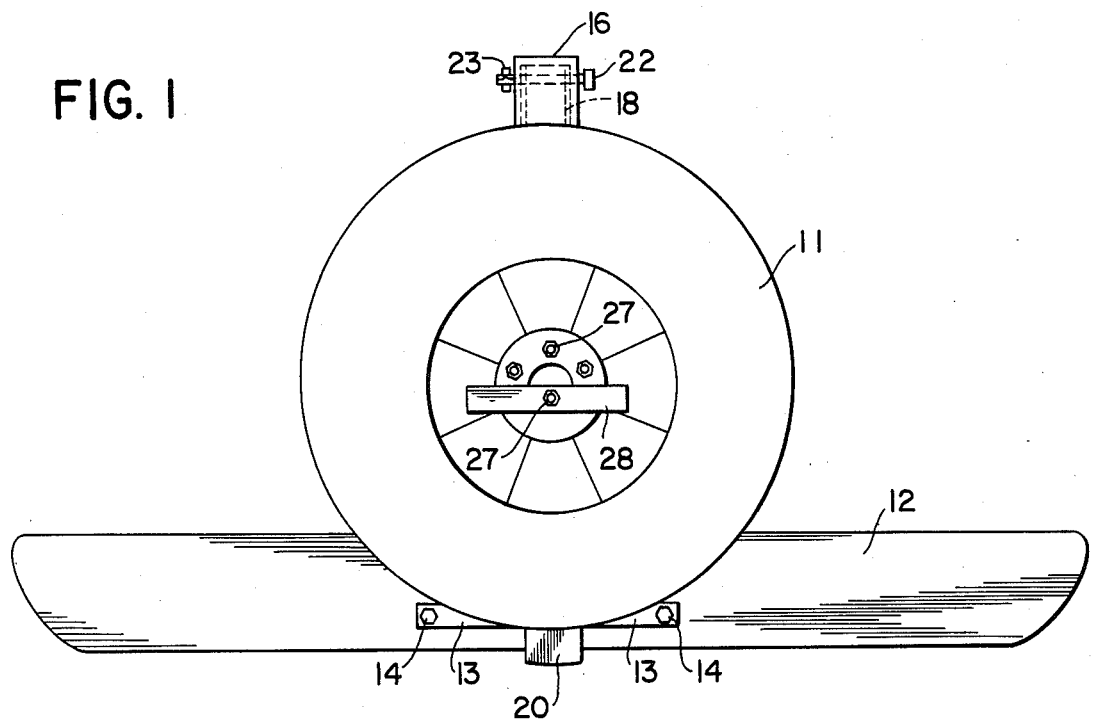
FIG. 1 is a front elevational view illustrating the tire carrier of the invention with a tire in place.
Figure 2:
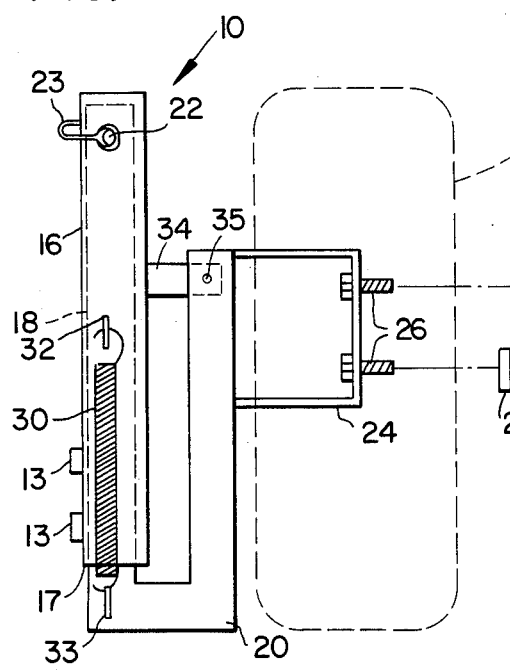
FIG. 2 is a side elevational view illustrating a tire carrier of the invention.
Figure 3:
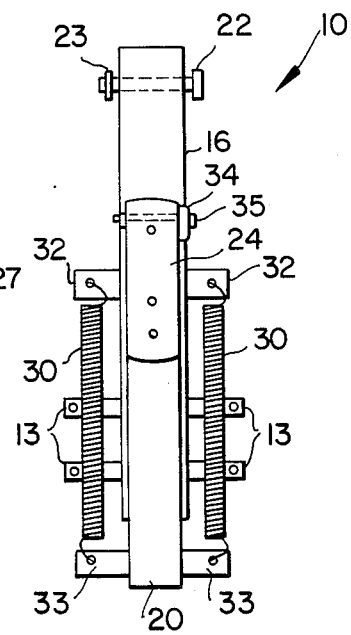
FIG. 3 is a front elevational view of the tire carrier shown in FIG. 2.

In FIGS. 1, 2 and 3 there is shown and illustrated a tire carrier 10 of the invention. FIG. 1 illustrates the carrier secured to the front bumper 12 of a vehicle (e.g., a pickup or motor home) by mans of brackets 13 and bolts 14. Tire 11 is shown attached to the carrier in FIG. 1. The carrier is shown in its normal upward position for travel in FIGS. 1-3.

The tire carrier includes an elongated upright tubular housing 16 having an open lower end 17. The housing 16 is secured to the mounting brackets 13, e.g., by welding and is disposed vertically as shown.

Slidably received in housing 16 is an elongated leg member 18 which can be moved vertically within the housing, as hereafter explained. The upper end of the leg 18 includes a transverse opening therethrough. When the leg 18 is in its upward position the opening is aligned with an opening in the upper end of housing 16 so that pin 22 may be inserted therethrough to lock leg 18 in its upward position for travel. Clip member 23 retains the pin 22 in place.

Secured to the lower end of leg 18 is a support arm 20. Preferably arm 20 extends upwardly, as shown, so as to be parallel to the leg 18. At the upper end of support arm 20 is attachment means 24 for attaching the tire 11 to arm 20. The attachment means includes bolts 26 and nuts 27.

The upper bolt 26 extends through a lug bolt opening in the rim of the tire 11, and the lower bolt 26 extends through the hub opening in the rim. Bar 28 is placed on the front side of the rim of the tire and is secured by a bolt 26 and nut 27, as illustrated.

Spring members 30 urge the leg 18 to its normal upward position. The upper end of each spring member is attached to a bracket 32 carried by tubular housing 16. The lower end of each spring member is attached to a bracket 33 carried by the lower end of leg 18.

Optionally there may be included a stabilizer bar 34 which is secured to tubular housing 16 and which extends outwardly to a position adjacent support arm 20, as illustrated. A pin or bolt 35 extends through registering openings in bar 34 and arm 20 to connect the two. This provides additional stability to arm 20 when a heavy tire is being carried.

Figure 4:
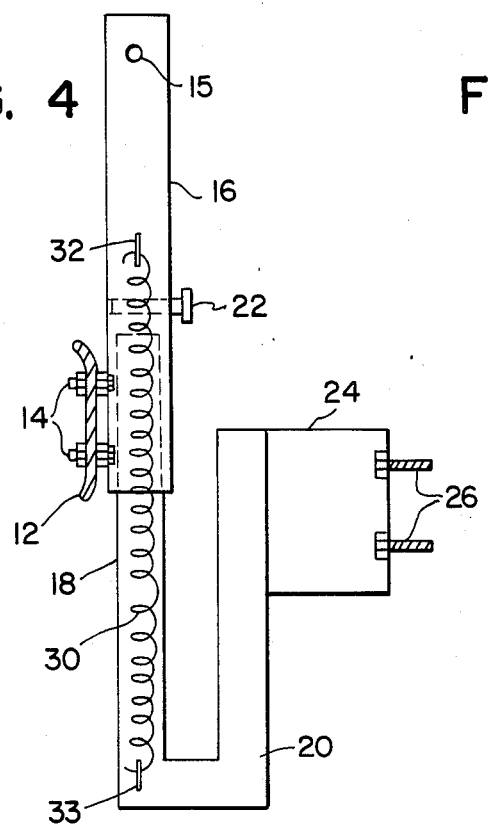
FIG. 4 is a side elevational view showing a tire carrier of the invention secured to a bumper of a vehicle; the carrier is shown in lowered position.
Figure 5:
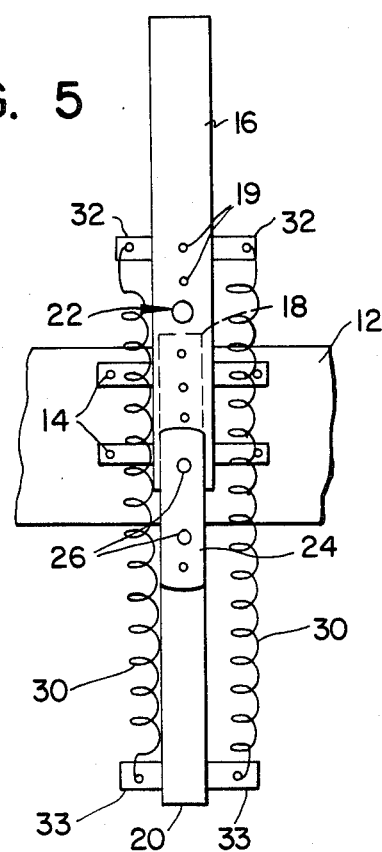
FIG. 5 is a front elevational view of the tire carrier shown in FIG. 4.

FIGS. 4 and 5 are side and front elevational views, respectively, illustrating the leg 18 in its downward position. Preferably the front face of tubular housing 16 includes a plurality of spaced apertures 19. Then when the leg 18 is urged downwardly to a desired vertical position, a pin may be inserted into one of the apertures just above the upper end of leg 18. For example, pin 22 may be used. This prevents leg 18 from being urged upwardly when the tire is detached from the support arm.

Figure 6:
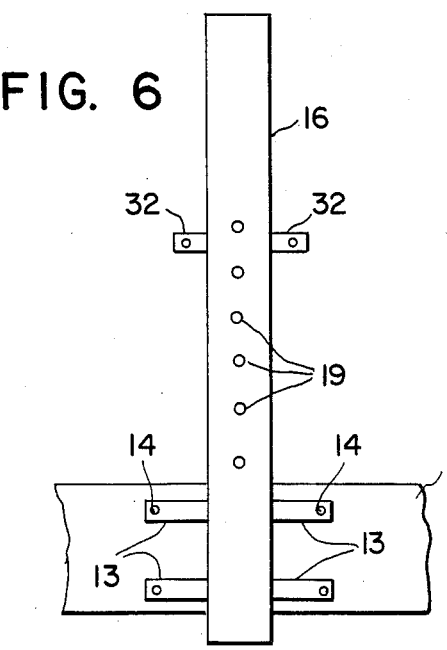
FIGS. 6 and 7 are front elevational views showing different manners in which the upright housing can be attached or secured to the bumper of a vehicle.
Figure 7:
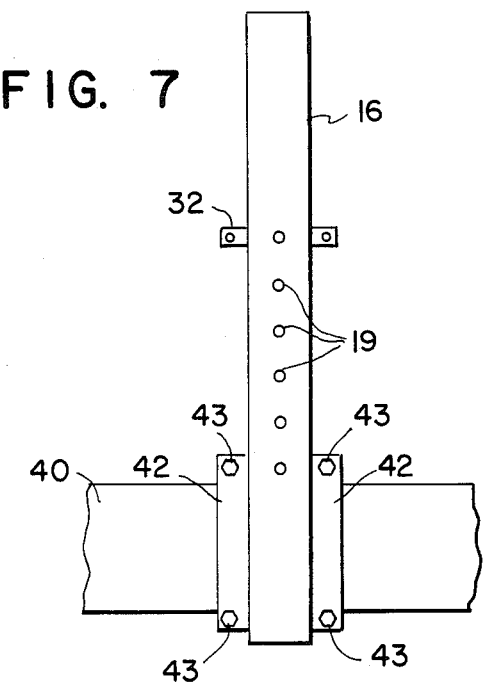

FIGS. 6 and 7 illustrate different manners of attaching the tubular housing 16 to a bumper of a vehicle. In FIG. 6 the housing 16 has brackets 13 secured thereto. Bolts 14 extend through the brackets and front bumper 12 to attach the housing. Preferably the upper brackets 13 have hole spacings corresponding to existing openings in the bumper which are ordinarily used for attaching a license plate. Thus, it is not necessary to make new openings in the bumper for the upper bolts 14.

In FIG. 7 the tubular housing 16 has secured thereto mounting brackets 42 which are adapted to attach the housing to a bumper 40. This type of bumper may be a square bumper, for example, of the type commonly used as a rear bumper on a recreational vehicle. Bolts 43 extend through openings in the brackets 42 above and below the bumper. A bar is normally placed on the opposite side of the bumper with openings of proper spacing to allow bolts 43 to extend through. When the bolts are tightened the housing is securely attached to the bumper.

Figure 8:
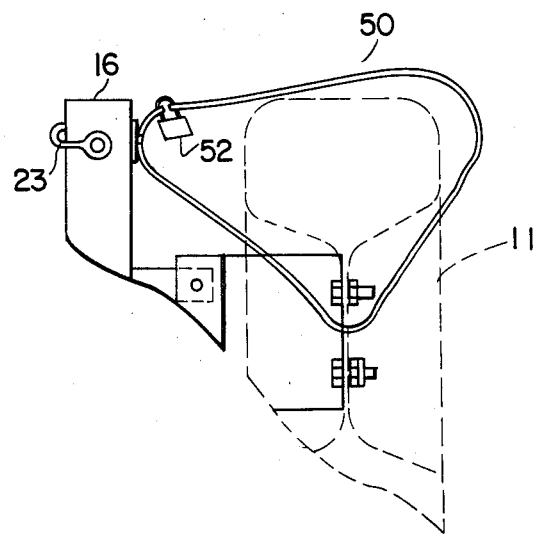
FIG. 8 is a side view illustrating one manner in which a tire can be locked to the carrier to prevent theft.

FIG. 8 illustrates one manner in which a tire 11 can be locked to the carrier to prevent theft. An elongated cable or chain 50 is welded to housing 16. One end of the cable or chain is passed through the hub opening in the rim and then around the tire. A padlock 52 secures the two ends of the cable or chain together.

Figure 9:
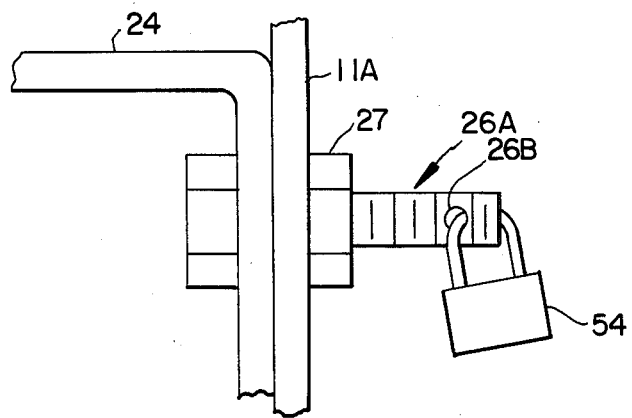
FIG. 9 is a side view illustrating another manner in which a tire can be locked to the carrier to prevent theft.

FIG. 9 illustrates another manner of locking the tire to the carrier. In this embodiment the attachment bolt 26A includes an opening 26B near the outer end through which a padlock 54 may be inserted, as illustrated. This prevents the nut 27 from being removed from the bolt when the rim 11A of the tire is secured in place.

Other variations are permissible without departing from the scope of the present invention. The tubular housing 16 is preferably square in cross-section, although it could have other configurations also. The length of the housing 16 may also vary. Similarly the length of the leg 18 may also vary.

The diameter of housing 16 is typically about 2 inches, and the diameter of leg 18 is typically about 1.5 inches so that leg 18 will slide within housing 18 without binding. Of course, grease or other lubricants can be used to reduce friction between these two elements.

The spring member(s) may vary in length and strength. For example, larger springs are normally used on carriers intended to carry very heavy tires.

Other variants are also possible.

What is claimed is:

1. A tire carrier adapted to be secured to a vehicle for the purpose of carrying a spare tire, said tire carrier comprising:
   (a) an upright tubular housing having upper and lower ends, wherein said lower end is open;
   (b) mounting means adapted to secure said tubular housing to said vehicle in a manner such that said housing is vertically disposed;
   (c) an elongated leg member slidably received in said tubular housing and being movable within said housing between an upward position and a lowered position;
   (d) a tire support arm secured to said elongated leg member;
   (e) tire attachment means carried by said support arm for detachably securing said tire to said support arm;
   (f) bias means for biasing said leg member toward its said upward position;
   (g) first lock means adapted to lock said leg member in said upward position; and
   (h) second lock means adapted to lock said leg member in said lowered position;
   wherein said leg member is adapted to be lowered in order to remove said tire from said support arm or to attach said tire to said support arm, after which said bias means is adapted to raise said leg member to its said upward position.

2. A tire carrier in accordance with claim 1, wherein said vehicle includes a bumper, and wherein said mounting means is adapted to secure said tubular housing to said bumper.

3. A tire carrier in accordance with claim 1, wherein said leg member includes upper and lower ends and said support arm includes upper and lower ends, wherein said lower end of said support arm is secured to said lower end of said leg member, and wherein said support arm is parallel to said leg member.

4. A tire carrier in accordance with claim 1, wherein said bias means comprises a spring having first and second ends, wherein said first end of said spring is secured to said tubular housing and said second end is secured to said leg member.

5. A tire carrier in accordance with claim 3 wherein said upper ends of said tubular housing and said leg member each include an aperture extending transversely therethrough, and wherein said first lock means comprises a pin member adapted to be slidably inserted through said apertures when said leg member is in said upward position.

6. A tire carrier in accordance with claim 3, wherein said tubular housing includes at least one aperture therethrough between said upper and lower ends, and wherein said second lock means comprises a pin member adapted to be inserted into said aperture when said leg member is in said lowered position.

7. A tire carrier in accordance with claim 1, further comprising stabilizing means secured to said tubular housing and being adapted to be detachably secured to said tire support arm.

8. A tire carrier in accordance with claim 1, further comprising tire lock means adapted to lock said tire on said tire support arm.

9. A tire carrier adapted to be secured to a vehicle for the purpose of carrying a spare tire, said tire carrier comprising:
  (a) an elongated, upright, tubular housing having upper and lower ends, wherein said lower end is open;
  (b) mounting means adapted to secure said tubular housing to said vehicle in a manner such that said housing is vertically disposed;
  (c) an elongated leg member slidably received in said tubular housing and being movable within said tubular housing between an upward position and a lowered position; wherein said leg member includes an upper end and a lower end;
  (d) a tire support arm including upper and lower ends, wherein said lower end is secured to said lower end of said leg member, and wherein said support arm is parallel to said leg member;
  (e) tire attachment means carried by said upper end of said support arm for detachably securing said tire to said support arm;
  (f) bias means for biasing said leg member toward its said upward position;
  (g) first lock means adapted to lock said leg member in said upward position; and
  (h) second lock means adapted to lock said leg member in said lowered position.

10. A tire carrier in accordance with claim 9, wherein said vehicle includes a bumper, and wherein said mounting means is adapted to secure said tubular housing to said 11. A tire carrier in accordance with claim 9, wherein said bias means comprises a spring having first and second ends, wherein said first end of said spring is secured to said tubular housing and said second end is secured to said leg member.

12. A tire carrier in accordance with claim 9, wherein said upper ends of said tubular housing and said leg member each include an aperture extending transversely therethrough, and wherein said first lock means comprises a pin member adapted to be slidably inserted through said apertures when said leg member is in said upward position.

13. A tire carrier in accordance with claim 9, wherein said tubular housing includes at least one aperture therethrough between said upper and lower ends, and wherein said second lock means comprises a pin member adapted to be inserted into said aperture when said leg member is in said lowered position.

14. A tire carrier in accordance with claim 9, further comprising stabilizing means secured to said tubular housing and being adapted to be detachably secured to said tire support arm.

15. A tire carrier in accordance with claim 9, further comprising tire lock means adapted to lock said tire on said tire support arm.

16. A tire carrier adapted to be secured to the bumper of a vehicle to carry a spare tire, said system comprising:
  (a) an elongated, upright, tubular housing having upper and lower ends, wherein said lower end is open;
  (b) mounting means adapted to secure said tubular housing to said bumper in a manner such that said housing is vertically disposed;
  (c) an elongated leg member slidably received in said tubular housing and being movable within said tubular housing between an upward position and a lowered position; wherein said leg member includes an upper end and a lower end;
  (d) a tire support arm including upper and lower ends, wherein said lower end is secured to said lower end of said leg member, and wherein said support arm is parallel to said leg member;
  (e) tire attachment means carried by said upper end of said support arm for detachably securing said tire to said support arm;
  (f) bias means for biasing said leg member toward its said upward position;
  (g) first lock means adapted to lock said leg member in said upward position; and
  (h) second lock means adapted to lock said leg member in said lowered position;
wherein said upper ends of said tubular housing and said leg member each include an aperture extending transversely therethrough, and wherein said first lock means comprises a pin member adapted to be slidably inserted through said apertures when said leg member is in said upward position.

17. A tire carrier system in accordance with claim 16, wherein said tubular housing includes at least one aperture therethrough between said upper and lower ends, and wherein said second lock means comprises a pin member adapted to be inserted into said aperture when said leg member is in said lowered position.

* * * * *